(## United States Patent [19]

Hirose et al.

[11] 3,811,938
[45] May 21, 1974

[54] PRODUCTION OF BARIUM TITANATE CERAMICS HAVING A POSITIVE TEMPERATURE COEFFICIENT OF ELECTRICAL RESISTANCE

[75] Inventors: Namio Hirose; Yoshihiro Matsuo; Shigeru Hayakawa, all of Osaka, Japan

[73] Assignee: Matsushita Electric Industrial Co. Ltd., Osaka, Japan

[22] Filed: June 9, 1972

[21] Appl. No.: 261,330

[52] U.S. Cl............... 117/224, 117/8, 117/64 R, 117/113, 117/223, 252/62.9, 310/8
[51] Int. Cl............... B44d 1/02, B44d 1/06
[58] Field of Search........ 310/8; 252/62.9; 117/223, 117/224, 201, 113, 114 R, 8, 64 R

[56] References Cited
UNITED STATES PATENTS 3,585,415  6/1971  Muller ................................... 310/8
3,388,001  6/1968  Blum .................................... 117/223
2,989,482  6/1961  Miller ................................... 252/62.9
2,633,543  3/1953  Howalt .................................. 310/8

*Primary Examiner*—Leon D. Rosdol
*Assistant Examiner*—Michael F. Esposito
*Attorney, Agent, or Firm*—Wenderoth, Lind & Ponack

[57] ABSTRACT

A process for improving the electrical properties of barium titanate ceramics having a positive temperture coefficient of electrical resistance comprises providing barium titanate ceramics having a positive temperature coefficient of electrical resistance, coating said barium titanate ceramics with at least one compound selected from the group consisting of silver compound and lithium compound; and heating the coated barium titanate ceramics at a temperature of 700°C to 1,200°C.

2 Claims, No Drawings

PRODUCTION OF BARIUM TITANATE CERAMICS HAVING A POSITIVE TEMPERATURE COEFFICIENT OF ELECTRICAL RESISTANCE

This invention relates to the production of barium titanate ceramics having a positive temperature coefficient of electrical resistance (PTC barium titanate thermistor), particularly to the production of barium titanate ceramics having a large positive temperature coefficient of electrical resistance.

It has been well known that barium titanate has a perovskite structure and becomes semiconductive with the addition of rare earth, niobium, bismuth and antimony ions. Semiconductive barium titanate ceramics have a positive temperature coefficient (PTC) of electrical resistance above their Curie temperature, and the substitution of lead (Pb) and tin (Sn) for barium (Ba) and titanium (Ti) respectively changes their Curie temperature.

The application of PTC barium titanate thermistor for electrical devices requires a PTC barium titanate thermistor having a large positive temperature coefficient of electrical resistance ($R_{max}/R_{min}$, $R_{max}$: maximum resistance, $R_{min}$: minimum resistance) to control large electric powers.

It is an object of this invention to provide a process for making PTC barium titanate thermistor having a large positive temperature coefficient of electrical resistances ($R_{max}/R_{min}$).

This object will become apparent upon consideration of the following detailed description.

A process for improving the electrical properties of barium titanate ceramics having a positive temperature coefficient of electrical resistance according to the present invention comprises providing barium titanate ceramics having a positive temperature coefficient of electrical resistance, coating said barium titanate ceramics with at least one compound selected from the group consisting of silver compound and lithium compound and heating the coated barium titanate ceramics at a temperature of 700°C to 1,200°C.

The barium titanate ceramics referred to herein are in a composition comprising, as a main component, titanium dioxide and barium carbonate and an effective additive to cause a positive temperature coefficient of electrical resistance. The effective additives are niobium oxide, bismuth oxide, antimony oxide, and rare earth oxide as shown in many literatures. If necessary for control of Curie temperature, the barium titanate ceramics may be modified with any effective element such as lead for barium and tin for titanium.

The silver compound or lithium compound referred to herein is a material to be converted into silver oxide or lithium oxide upon being heated at a temperature higher than 700°C. Operable compounds are silver nitrate, silver carbonate, silver oxide, silver sulfide, silver sulfate, silver sulfite, silver fluoride, lithium nitrate, lithium carbonate, lithium oxide, lithium oxalate and lithium hydroxide.

The barium titanate ceramics can be coated with the silver compound or the lithium compound by any suitable and available method. For example, the barium titanate ceramics in a crucible can be covered with the silver compound and/or lithium compound in a powder form. A preferable method is to immerse the barium titanate ceramics in an aqueous solution of the silver nitrate and/or lithium nitrate and dry the barium titanate ceramics. The operable aqueous solution is in a concentration from 10 weight percent to the saturation at a temperature of room temperature to 100°C. Another preferable method is to dip the barium titanate ceramics in a melt of silver nitrate and/or lithium nitrate for about 10 minutes and to withdraw the barium titanate ceramics from the melt. The coating can be achieved by another method to apply a paste including the silver compound and/or lithium compound in a powder form to the barium titanate ceramics.

The barium titanate ceramics having a positive temperature coefficient of electrical resistance can be formed in accordance with any suitable and available ceramic technique as shown in many literature.

The coated barium titanate ceramics are heated at a temperature of 700°C to 1,200°C in an oxidizing atmosphere such as air or oxygen. The heating period is dependent upon the heating temperature. The lower heating temperature requires the longer heating period. For example, the coated barium titanate ceramics is heated at 1,000°C for 2 hours. After heating, the remains of coating compound on the surface of barium titanate ceramics are removed.

If the silver compound or lithium compound is mixed with materials of barium titanate ceramics, pressed into a desired form and is sintered, the resultant sintered body does not show the novel effect according to the present invention, i.e. a higher positive temperature coefficient of electrical resistance ($R_{max}/R_{min}$).

Referring to Table I, compositions 4 to 8, or compositions 9 to 13 shown in Table I show the case that silver oxide or lithium carbonate were mixed with other raw materials of barium titanate ceramics of composition 1 of Table I and calcined, pressed and sintered at 1,250°C. The ceramics so produced show a higher resistivities and a lower $R_{max}/R_{min}$ value with a higher amount of silver or lithium carbonate. This proves that the barium titanate ceramics obtained by a mere addition of silver oxide or lithium carbonate into the raw materials is inferior in the electrical properties to those by the novel method according to the present invention.

Table I

| Composition | BaCO$_3$ | TiO$_2$ | SnO$_2$ | PbO | Nb$_2$O$_5$ | Sb$_2$O$_3$ | La$_2$O$_3$ | Ag$_2$O | Li$_2$CO$_3$ | Resistivity at room temperature (ohm-cm) | $R_{max}R_{min}$ |
|---|---|---|---|---|---|---|---|---|---|---|---|
| 1 | 1.0 | 1.0 | | | .001 | | | | | 40 | $10^{4.5}$ |
| 2 | 1.0 | .97 | .03 | | | .001 | | | | 45 | $10^{4.5}$ |
| 3 | .98 | 1.0 | | .02 | | | .002 | | | 35 | $10^{5.0}$ |
| 4 | 1.0 | 1.0 | | | .001 | | | .0001 | | 40 | $10^{4.5}$ |
| 5 | 1.0 | 1.0 | | | .001 | | | .0001 | | 40 | $10^{4.5}$ |
| 6 | 1.0 | 1.0 | | | .001 | | | .001 | | 80 | $10^{4.5}$ |
| 7 | 1.0 | 1.0 | | | .001 | | | .01 | | 500 | $10^{4.0}$ |
| 8 | 1.0 | 1.0 | | | .001 | | | .10 | | 10000 | $10^{3.0}$ |
| 9 | 1.0 | 1.0 | | | .001 | | | | .00001 | 40 | $10^{4.5}$ |
| 10 | 1.0 | 1.0 | | | .001 | | | | .0001 | 40 | $10^{4.5}$ |
| 11 | 1.0 | 1.0 | | | .001 | | | | .001 | 100 | $10^{4.5}$ |

Table I – Continued

| | BaCO$_3$ | TiO$_2$ | SnO$_2$ | PbO | Nb$_2$O$_5$ | Sb$_2$O$_3$ | La$_2$O$_3$ | Ag$_2$O | Li$_2$CO$_3$ | Resistivity at room temperature (ohm-cm) | $R_{max}/R_{min}$ |
|---|---|---|---|---|---|---|---|---|---|---|---|
| 12 | 1.0 | 1.0 | | | .001 | | | | .01 | 600 | $10^{4.0}$ |
| 13 | 1.0 | 1.0 | | | .001 | | | | .10 | 10000 | $10^{3.0}$ |

EXAMPLE

The barium titanate ceramics in a compound 1 of Table I were prepared by a conventional ceramic technique. The raw materials corresponding to the composition 1 are wet-milled and calcined at about 1,000°C for 2 hours. The calcined mixtures were pressed into a desired disc form by a pressure of 700kg/cm$^2$ and were sintered at 1,350°C for 1 hour. The sintered discs were immersed into the aqueous solution of 20 weight percent of silver nitrate at room temperature for 10 minutes to coat with silver nitrate (sample 1 to 6), or into the aqueous solution of 20 weight percent of lithium nitrate at room temperature for 10 minutes (samples 7 to 12), or into the aqueous solution containing 10 weight percent of silver nitrate and 10 weight percent of lithium nitrate at room temperature for 10 minutes (samples 13 to 18) as shown in Table II. The barium titanate ceramics were dried and heated at a temperature of 600° to 1,300°C. From the results of samples 1 to 6, the electrical resistivities of samples 2 to 5 were almost equal to or a little larger than that of the original (composition 1) ceramic subjected to no treatment of silver compound or lithium compound as shown in Table II. To the contrary, the raios of $R_{max}/R_{min}$ became much larger by orders of 3/2 to 5/2 than that of the original ceramic. When said coated ceramics were heated above 1,300°C, $R_{max}/R_{min}$ value, for example, of sample 1 was rather smaller than that of original ceramic, and at the same time the resistivity of sample 1 became much larger than that of original ceramic. When said coated ceramics were heated at below 600°C, $R_{max}/R_{min}$ value, for example, of sample 6 did not become larger than that of oroginal ceramic.

Samples 7 to 12 treated with silver nitrate aqueous solution and samples 13 to 18 treated with silver nitrate and lithium nitrate aqueous solution at room temperature showed tendencies similar to those of samples 1 to 6.

Samples 19 to 24, samples 25 to 30 and samples 31 to 36 were obtained by immersing the sintered discs in composition 1 into a melt of silver nitrate, a melt of lithium nitrate and a melt of 50 wt percent of silver nitrate and 50 wt percent of lithium nitrate, respectively. So produced samples 19 to 36 showed the tendencies similar to those with samples 1 to 18.

Samples 37 to 48 were obtained by using sintered discs in composition 2 of Table I prepared by a method the same as those of composition 1. Sampes 37 to 42 were immersed into an aqueous solution of 20 wt percent of silver nitrate at room temperature. Samples 43 to 48 were immersed into a melt of silver nitrate at 300°C. The resultant samples 37 to 48 showed the similar tendencies to the above mentioned.

Samples 49 to 60 were obtained by using sintered discs in composition 3 of Table I prepared by a method the same as that of composition 1. Samples 49 to 54 and samples 55 to 60 were immersed into an aqueous solution of 20 wt percent of lithium nitrate at room temperature and a melt of lithium nitrate at 300°C, respectively, The resultant sintered samples 49 to 60 showed the similar tendencies to the above mentioned.

Samples 61 to 72 were obtained by using sintered discs in composition 1 prepared by a method the same as that of samples 1 to 36. A paste of 60 wt percent of silver carbonate and 40 wt percent of water was applied to samples 61 to 66 by brushing and then was dried at 100°C. A paste of 60 wt percent of lithium carbonate and 40 wt percent of water was applied to the samples 67 to 72. The coated discs were heated at various temperatures ranging from 600°C to 1,300°C. The resultant samples 61 to 72 showed the tendencies similar to those of the above mentioned.

Table II

| Sample No. | Composition | Treating | Heating temperature (°C) | Heating time (hr) | Resistivity (ohm-cm) | $R_{max}/R_{min}$ |
|---|---|---|---|---|---|---|
| 1 | | immersing in 20 wt% of AgNO$_3$ aqueous solution at room temperature | 1300 | | 5000 | $10^{4.0}$ |
| 2 | | | 1200 | | 300 | $10^{6.0}$ |
| 3 | | | 1100 | | 45 | $10^{7.0}$ |
| 4 | 1 | | 900 | 1.0 | 40 | $10^{6.5}$ |
| 5 | | | 700 | | 40 | $10^{6.0}$ |
| 6 | | | 600 | | 40 | $10^{4.5}$ |
| 7 | | immersing in 20 wt% of LiNO$_3$ aqueous solution at room temperature | 1300 | | 8000 | $10^{4.5}$ |
| 8 | | | 1200 | | 400 | $10^{6.5}$ |
| 9 | | | 1100 | | 45 | $10^{7.5}$ |
| 10 | 1 | | 900 | 1.0 | 45 | $10^{7.0}$ |
| 11 | | | 700 | | 45 | $10^{6.5}$ |
| 12 | | | 600 | | 40 | $10^{4.5}$ |
| 13 | | immersing in aqueous solution containing 10 wt% AgNO$_3$ and 10 wt% LiNO$_3$ at room temperature | 1300 | | 8000 | $10^{3.5}$ |
| 14 | | | 1200 | | 500 | $10^{6.5}$ |
| 15 | | | 1100 | | 50 | $10^{7.5}$ |
| 16 | 1 | | 900 | 1.0 | 45 | $10^{7.0}$ |
| 17 | | | 700 | | 40 | $10^{6.5}$ |
| 18 | | | 600 | | 40 | $10^{4.5}$ |

Table II —Continued

| Sample No. | Composition | Treating | Heating temperature (°C) | Heating time (hr) | Resistivity (ohm-cm) | $R_{max}/R_{min}$ |
|---|---|---|---|---|---|---|
| 19 | | immersing in a melt of AgNO₃ at 300°C | 1300 | | 7000 | $10^{4.0}$ |
| 20 | | | 1200 | | 400 | $10^{6.0}$ |
| 21 | | | 1100 | | 50 | $10^{8.0}$ |
| 22 | 1 | | 900 | 1.0 | 45 | $10^{7.5}$ |
| 23 | | | 700 | | 45 | $10^{7.0}$ |
| 24 | | | 600 | | 40 | $10^{4.5}$ |
| 25 | | immersing in a melt of LiNO₃ at 300°C | 1300 | | 10000 | $10^{3.5}$ |
| 26 | | | 1200 | | 500 | $10^{6.0}$ |
| 27 | | | 1100 | | 50 | $10^{8.0}$ |
| 28 | 1 | | 900 | 1.0 | 45 | $10^{7.5}$ |
| 29 | | | 700 | | 45 | $10^{7.0}$ |
| 30 | | | 600 | | 40 | $10^{4.5}$ |
| 31 | | immersing in melt of 50 wt% of AgNO₃ and 50 wt% of LiNO₃ at 300°C | 1300 | | 10000 | $10^{3.5}$ |
| 32 | | | 1200 | | 550 | $10^{6.0}$ |
| 33 | | | 1100 | | 50 | $10^{8.0}$ |
| 34 | 1 | | 900 | 1.0 | 50 | $10^{7.5}$ |
| 35 | | | 700 | | 45 | $10^{7.0}$ |
| 36 | | | 600 | | 40 | $10^{4.5}$ |
| 37 | | immersing in 20 wt% of AgNO₃ aqueous solution at room temperature | 1300 | | 7000 | $10^{4.0}$ |
| 38 | | | 1200 | | 400 | $10^{6.0}$ |
| 39 | | | 1100 | | 50 | $10^{7.0}$ |
| 40 | 2 | | 900 | 1.0 | 50 | $10^{6.5}$ |
| 41 | | | 700 | | 45 | $10^{6.0}$ |
| 42 | | | 600 | | 45 | $10^{4.5}$ |
| 43 | | immersing in a melt of AgNO₃ at 300°C | 1300 | | 9000 | $10^{3.5}$ |
| 44 | | | 1200 | | 500 | $10^{6.5}$ |
| 45 | | | 1100 | | 55 | $10^{8.0}$ |
| 46 | 2 | | 900 | 1.0 | 50 | $10^{7.0}$ |
| 47 | | | 700 | | 45 | $10^{6.5}$ |
| 48 | | | 600 | | 45 | $10^{4.5}$ |
| 49 | | immersing in 20 wt% of LiNO₃ aqueous solution at room temperature | 1300 | | 9000 | $10^{3.5}$ |
| 50 | | | 1200 | | 400 | $10^{6.0}$ |
| 51 | | | 1100 | | 45 | $10^{8.0}$ |
| 52 | 3 | | 900 | 1.0 | 40 | $10^{7.0}$ |
| 53 | | | 700 | | 35 | $10^{6.5}$ |
| 54 | | | 600 | | 35 | $10^{5.0}$ |
| 55 | | immersing in a melt of LiNO₃ at 300°C | 1300 | | 9000 | $10^{4.5}$ |
| 56 | | | 1200 | | 500 | $10^{6.5}$ |
| 57 | | | 1100 | | 50 | $10^{8.5}$ |
| 58 | 3 | | 900 | 1.0 | 40 | $10^{7.0}$ |
| 59 | | | 700 | | 35 | $10^{6.5}$ |
| 60 | | | 600 | | 35 | $10^{5.0}$ |
| 61 | | painting with Ag₂CO₃ | 1300 | | 7000 | $10^{4.0}$ |
| 62 | | | 1200 | | 350 | $10^{6.0}$ |
| 63 | | | 1100 | | 45 | $10^{7.5}$ |
| 64 | 1 | | 900 | 1.0 | 45 | $10^{7.5}$ |
| 65 | | | 700 | | 45 | $10^{7.0}$ |
| 66 | | | 600 | | 40 | $10^{4.5}$ |
| 67 | | painting with Li₂CO₃ | 1300 | | 7000 | $10^{4.0}$ |
| 68 | | | 1200 | | 400 | $10^{6.0}$ |
| 69 | | | 1100 | | 50 | $10^{7.5}$ |
| 70 | 1 | | 900 | 1.0 | 45 | $10^{7.5}$ |
| 71 | | | 700 | | 45 | $10^{7.0}$ |
| 72 | | | 600 | | 40 | $10^{4.5}$ |

What is claimed is:

1. A process for improving the electrical properties of a barium titanate ceramic body having a positive temperature coefficient of electrical resistance, which comprises:
   a. coating a barium titanate ceramic body having a positive temperature coefficient of electrical resistance with at least one member selected from the group consisting of silver carbonate, silver oxide, silver sulphide, silver sulphate, silver sulphite, silver fluoride, silver nitrate, lithium carbonate, lithium oxide, lithium oxalate, lithium hydroxide and lithium nitrate;
   b. heating the coated barium titanate ceramic body at a temperature of from 700° to 1200°C in an oxidizing atmosphere; and
   c. removing the remains of the coating materials on the surface of the barium titanate ceramic body.

2. A process according to claim 1, wherein said step of coating is carried out by immersing said ceramic body in an aqueous solution or a melt of silver nitrate and/or lithium nitrate.

* * * * *